(12) United States Patent
Hornqvist

(10) Patent No.: US 11,815,451 B2
(45) Date of Patent: Nov. 14, 2023

(54) METHOD FOR MEASURING THE ABSORBANCE OF A SUBSTANCE IN A SOLUTION AND A MEASURING DEVICE THEREFOR

(71) Applicant: Cytiva Sweden AB, Uppsala (SE)

(72) Inventor: Mikael Anders Hornqvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 16/316,276

(22) PCT Filed: Jun. 27, 2017

(86) PCT No.: PCT/EP2017/065912
§ 371 (c)(1),
(2) Date: Jan. 8, 2019

(87) PCT Pub. No.: WO2018/010956
PCT Pub. Date: Jan. 18, 2018

(65) Prior Publication Data
US 2019/0323953 A1   Oct. 24, 2019

(30) Foreign Application Priority Data
Jul. 11, 2016  (GB) ...................................... 1612010

(51) Int. Cl.
*G01N 21/33* (2006.01)
*G01N 21/05* (2006.01)
(Continued)

(52) U.S. Cl.
CPC ............. *G01N 21/33* (2013.01); *G01N 21/05* (2013.01); *G01N 21/8507* (2013.01);
(Continued)

(58) Field of Classification Search
CPC ........ G01N 21/33; G01N 30/74; G01N 21/05; G01N 2201/127; G01N 2201/0625;
(Continued)

(56) References Cited

U.S. PATENT DOCUMENTS 3,834,821 A   9/1974  Ferrari et al.
5,345,306 A *  9/1994  Ichimura ................ G01N 21/17
                                                    356/451
(Continued)

FOREIGN PATENT DOCUMENTS

GB        1468728      3/1977
JP        48-40491     1/1972
(Continued)

OTHER PUBLICATIONS

PCT International Search Report and Written Opinion for PCT Application No. PCT/EP2017/065912 dated Sep. 26, 2017 (14 pages).

(Continued)

*Primary Examiner* — Kiho Kim
(74) *Attorney, Agent, or Firm* — Eversheds Sutherland (US) LLP

(57) ABSTRACT

Disclosed is a method for measuring the absorbance of light of a substance in a solution in a measuring cell (23; 223'), said method comprising the steps of: transmitting (S1) a first light beam (27; 27') from a light source (25; 25') towards a beam splitter (29; 29'); dividing (S3) the first light beam (27; 27') into a signal light ray (31; 31') and a reference light ray (33; 33') by the beam splitter (29; 29'); modulating (S5) the signal light ray (31; 31'); modulating the reference light ray (33; 33'); providing (S9) the measuring cell (23; 23') such that the signal light ray (31; 31') passes through the measuring cell; detecting (S11) a signal in a detector (39; 39'), which signal is the combined signal intensity of the signal (Continued)

light ray (31; 31') and the reference light ray (33; 33') detected by the detector (39; 39'); performing synchronous detection (S15) of the detected signal in order to reconstruct the intensities of the signal light ray (31; 31') and the reference light ray (33; 33') from the combined signal detected by the detector (39; 39'), said synchronous detection being based on the modulation performed to the signal light ray and the reference light ray. Disclosed also is a measuring device for carrying out said method.

14 Claims, 3 Drawing Sheets

(51) Int. Cl.
  *G01N 30/74* (2006.01)
  *G01N 21/85* (2006.01)
  *G01N 21/31* (2006.01)
  *G01N 30/02* (2006.01)

(52) U.S. Cl.
  CPC ..... *G01N 30/74* (2013.01); *G01N 2021/3125* (2013.01); *G01N 2030/027* (2013.01); *G01N 2201/0624* (2013.01); *G01N 2201/0625* (2013.01); *G01N 2201/0691* (2013.01); *G01N 2201/127* (2013.01)

(58) Field of Classification Search
  CPC ..... G01N 2201/0624; G01N 2030/027; G01N 21/8507; G01N 2021/3125; G01N 2201/0691
  See application file for complete search history.

(56) References Cited

U.S. PATENT DOCUMENTS

| | | | | |
|---|---|---|---|---|
| 5,504,337 | A * | 4/1996 | Lakowicz | G01N 21/6408 356/318 |
| 2005/0206984 | A1 * | 9/2005 | Kawano | G03H 1/02 359/8 |
| 2007/0008530 | A1 * | 1/2007 | Gibbs | G01J 1/46 356/368 |
| 2008/0087078 | A1 | 4/2008 | Vannuffelen et al. | |
| 2014/0183362 | A1 * | 7/2014 | Islam | A61B 5/4547 250/338.4 |
| 2014/0361172 | A1 * | 12/2014 | Little, III | G01N 21/3504 250/339.06 |
| 2015/0300955 | A1 * | 10/2015 | Al-Moniee | G01N 21/643 436/128 |

FOREIGN PATENT DOCUMENTS

| | | |
|---|---|---|
| JP | 51-136472 | 5/1975 |
| JP | S56-150332 A | 11/1981 |
| JP | 59-107221 | 6/1984 |
| JP | 60-093945 A | 5/1985 |
| JP | 05087733 A | 4/1993 |
| JP | 2000-019108 | 1/2000 |
| JP | 2007-093410 A | 4/2007 |
| SU | 1462986 A1 | 3/1991 |
| SU | 1114150 A1 | 6/1991 |
| SU | 1356703 A1 | 6/1991 |
| SU | 1398589 A1 | 6/1991 |
| WO | 2011/014144 A1 | 2/2011 |

OTHER PUBLICATIONS

Great Britain Search Report for GB Application No. 1612010.7 dated Jan. 12, 2017 (4 pages).
European Office Action for EP Application No. 17735452.9 dated Jan. 13, 2021 (6 pages).
Japanese Office Action for JP Application No. 2019-500830 dated May 10, 2021 (13 pages).
Japanese Office Action for JP Application No. 2019-500830 dated Jan. 4, 2022 (9 pages).
Decision to Reject the Amendments Issued in Japanese Patent Application No. 2019-500830, dated Aug. 1, 2022 (8 pages with English Translation).

* cited by examiner

METHOD FOR MEASURING THE ABSORBANCE OF A SUBSTANCE IN A SOLUTION AND A MEASURING DEVICE THEREFOR

CROSS REFERENCE TO RELATED APPLICATIONS

This application claims the priority benefit of PCT/EP2017/065912 filed on Jun. 27, 2017 which claims priority benefit of Great Britain Application No. 1612010.7, filed Jul. 11, 2016. The entire contents of which are hereby incorporated by reference herein.

TECHNICAL FIELD OF THE INVENTION

The present invention relates to a method and a measuring device for measuring the absorbance of a substance in a solution.

BACKGROUND OF THE INVENTION

Many substances absorb ultra violet or visible light due to their chemical composition. The absorption of light by substances has been used as the basis for detecting the presence of, and measuring the concentration of, such substances for many years. The concentration of the substance can be determined by use of the Beer Lambert Law:

$$A = Ebc$$

Where:
A is light absorbance;
E is the molar light absorbtivity with units of L mol$^{-1}$ cm$^{-1}$;
b is the light path length of the sample defined in cm; and
c is the concentration of the compound in solution, expressed in mol$^{-1}$.

The UV region can be considered to consist of light of wavelength in the region of 10 nm to 400 nm, light of wavelength of 180 nm to 300 nm being known as 'deep UV'. Most analytical instruments for detecting substances which absorb in the deep ultra violet (UV) region use a mercury-lamp, deuterium lamp or xenon flash lamp as a light source. One example of such an instrument is a flow cell in which a solution containing one or more UV absorbing substances is placed between a UV light source (e.g. a mercury-lamp) and a UV detector (e.g. a photomultiplier, a photodiode or a photo transistor) and changes in the intensity of UV light reaching the detector are related to the concentration of UV absorbing substances in the solution.

The detection of proteins, nucleic acids and peptides are of great importance in many sectors, including the environmental, biological and chemical sciences. Proteins have mainly two absorption peaks in the deep UV region, one very strong absorption band with a maximum at about 190 nm, where peptide bonds absorb, and another less intense peak at about 280 nm due to light absorption by aromatic amino acids (e.g. tyrosine, tryptophan and phenylalanine).

WO2007/062800 and WO2013/178770 describe the use of a UV LED as a source of light for analysis of the concentration of a substance in a liquid sample.

The incoming light to the measuring arrangement from the UV LED is divided into a reference light ray provided directly to a detector and a signal light ray provided through the sample and then to a detector. The detected signal light ray is greatly amplified and compared to an amplified version of the detected reference light ray. There may be problems in these kind of systems related to drift since the high detector amplification means that any tiny unequal performance change in the channels due to for example temperature fluctuations or humidity changes will cause a drift in the measured absorption signal. Systems measuring absorbance changes over time in a flowing sample are naturally much more sensitive to drift in the system compared to systems doing short measurements on a static sample.

SUMMARY

An object of the present invention is to provide an improved method and a measuring device for measuring the absorbance of light of a substance in a solution in a measuring cell.

A further object of the present invention is to provide a method and a measuring device for measuring the absorbance of light of a substance in a solution in a measuring cell which are robust and reliable.

This is achieved in a method and a measuring device according to the independent claims.

Hereby only one detector is used to simultaneously measure both the reference light ray and the signal light ray which means that any drift caused by use of two separate detectors is eliminated.

According to the invention a method for measuring the absorbance of light of a substance in a solution in a measuring cell, said method comprising the steps of:
transmitting a first light beam from a light source towards a beam splitter;
dividing the first light beam into a signal light ray and a reference light ray by the beam splitter;
modulating the signal light ray;
modulating the reference light ray;
providing the measuring cell such that the signal light ray passes through the measuring cell;
detecting a signal in a detector, which signal is the combined signal intensity of the signal light ray and the reference light ray detected by the detector;
performing synchronous detection of the detected signal in order to reconstruct the intensities of the signal light ray and the reference light ray from the combined signal detected by the detector, said synchronous detection being based on the modulation performed to the signal light ray and the reference light ray.

Also according to the invention a measuring device is provided for measuring the absorbance of a substance in a solution in a measuring cell of the measuring device, wherein said measuring device comprises:
a light source transmitting a first light beam;
a beam splitter provided such that the first light beam is divided by the beam splitter into a signal light ray and a reference light ray;
the measuring cell positioned such that the signal light ray will pass through the measuring cell;
a first signal modulation device arranged to modulate the signal light ray; and
a second signal modulation device arranged to modulate the reference light ray; and
a detector arranged to detect the signal light ray when it has been modulated and passed the measuring cell and also detect the reference light ray when it has been modulated, wherein the detector comprises or is connected to a processing device which is configured for performing synchronous detection of the detected signal in order to reconstruct the intensities of the signal light ray and the reference light ray from the combined signal detected by the detector, said synchronous detection being based on the modulation performed to the signal light ray and the reference light ray.

The signal light ray and the reference light ray can be detected in the same detector simultaneously.

This is possible because of the modulation of the signals and hereby absorbance changes over time in a flowing sample can be measured.

In one embodiment of the invention the step of modulating the signal light ray comprises modulating the signal light ray at a first frequency and the step of modulating the reference light ray comprises modulating the reference light ray at a second frequency which is different from the first frequency. Hereby the two signals can be differentiated in the detector.

In one embodiment of the invention the steps of modulating the signal light ray and the reference light ray comprise creating a sine modulation or a square wave modulation to both the signal light ray and the reference light ray.

In one embodiment of the invention the measuring cell is a flow cell.

In one embodiment of the invention the method further comprises the step of changing direction of one or both of the signal light ray and the reference light ray with at least one light direction changing device such that both the signal light ray and the reference light ray can be detected by the same detector.

In one embodiment of the invention the step of modulating one of the signal light ray or the reference light ray comprises controlling the light source.

In one embodiment of the invention the measuring device further comprises at least one light direction changing device arranged to change the direction of the reference light ray or the signal light ray such that they can be detected by the same detector.

In one embodiment of the invention the first signal modulation device and the second signal modulation device are arranged to modulate the signals at different frequencies.

In one embodiment of the invention the first signal modulation device is a chopper, a shutter, a movable mirror, a tuning fork or an adjustable gray filter provided somewhere in the light path of the signal light ray.

In one embodiment of the invention the second signal modulation device is a chopper, a shutter, a movable mirror, a tuning fork or an adjustable gray filter provided somewhere in the light path of the reference light ray.

In one embodiment of the invention one of the first or second signal modulation device is a device controlling the light source.

In one embodiment of the invention the beam splitter is an asymmetrical beam splitter dividing the first light beam into a signal light ray and a reference light ray where a larger portion of the first light beam is directed to the signal light ray than to the reference light ray.

DETAILED DESCRIPTION OF THE EMBODIMENTS

Figure 1:
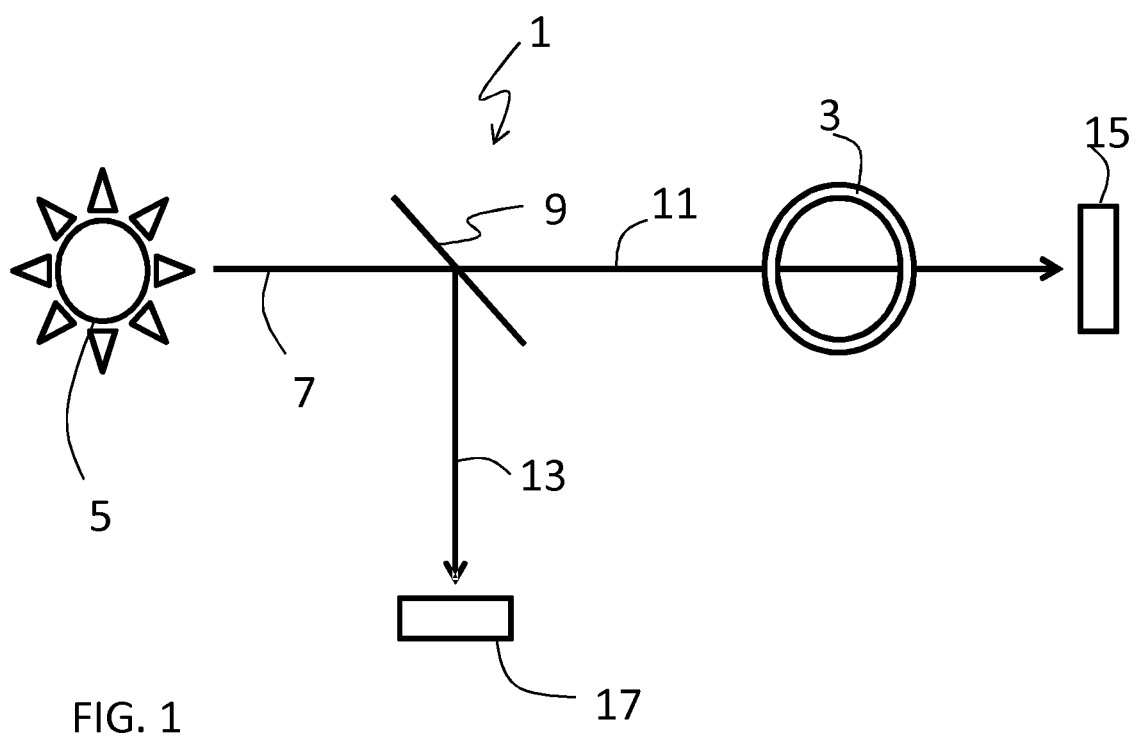
FIG. 1 shows schematically a measuring device of prior art.

FIG. 1 shows schematically a measuring device 1 of prior art for measuring the absorbance of a substance in a solution provided in a measuring cell 3. The measuring device 1 comprises a light source 5 which is transmitting a first light ray 7. Furthermore the measuring device comprises a beam splitter 9 provided in the measuring device such that the first light ray 7 is divided by the beam splitter 9 into a signal light ray 11 and a reference light ray 13. The measuring device 1 comprises further the measuring cell 3 which is positioned such that the signal light ray 11 will pass through the solution in the measuring cell 3. Furthermore the measuring device 1 comprises a first detector 15 arranged to detect the signal light ray 11 when it has passed the measuring cell 3 and a second detector 17 arranged to detect the reference light ray 13. From the detected reference- and signal values the absorbance of the sample can be calculated by the formula $A=\log_{10}$(reference value/signal value). As discussed above drift is a problem in these kinds of systems, especially when doing long, continuous measurements as in liquid chromatography. Small fluctuations in for example temperature may affect the two different detector channels unequally and thereby causing drift and non exact measurements.

Figure 2A:
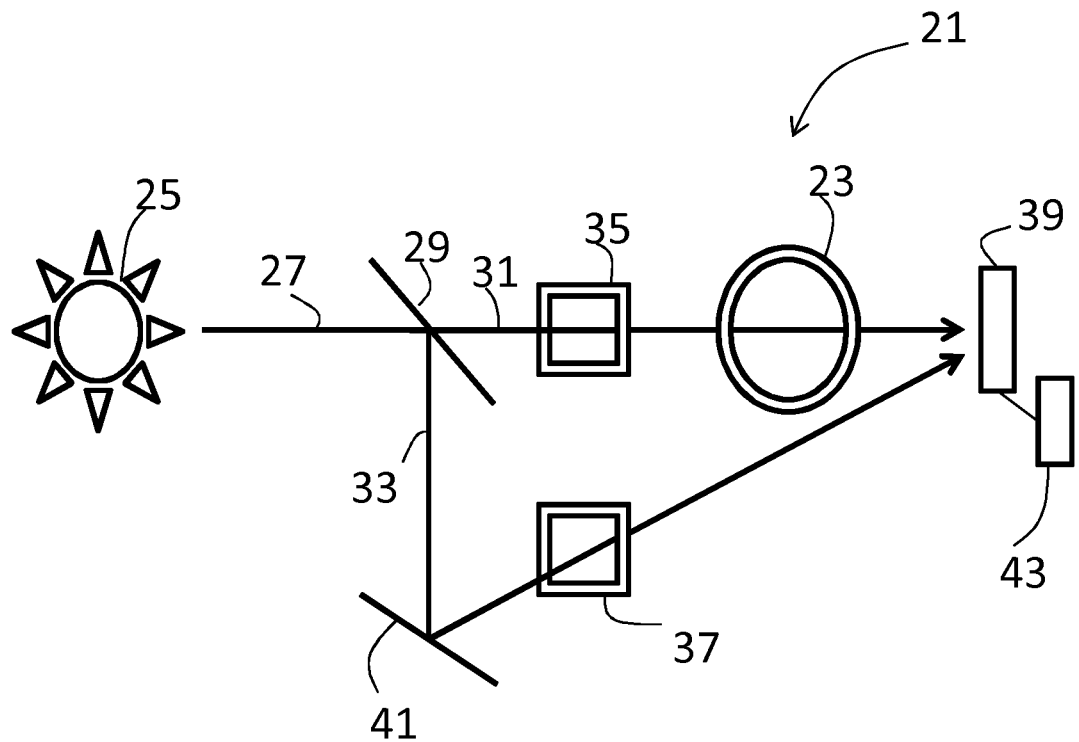
FIG. 2a shows schematically a measuring device according to one embodiment of the invention.

FIG. 2a shows schematically a measuring device 21 according to one embodiment of the invention. The measuring device 21 is arranged for measuring the absorbance of a substance in a solution provided in a measuring cell 23 of the measuring device. The measuring device 21 comprises a light source 25 which is transmitting a first light beam 27. The light source could be for example a LED or any other type of suitable lamp. The measuring device comprises further a beam splitter 29 provided such that the first light beam 27 is divided by the beam splitter 29 into a signal light ray 31 and a reference light ray 33. The beam splitter 29 can be for example a semitransparent mirror or two optical fibers side by side. The measuring device 21 comprises further the measuring cell 23 positioned such that the signal light ray 31 will pass through the solution in the measuring cell 23. The measuring cell 23 can be a static measuring cell comprising a sample to be measured but it could also be a flow cell in which the sample is flowing through during continuous measurements.

The measuring device 21 furthermore comprises a first signal modulation device 35 arranged to modulate the signal light ray 31 and a second signal modulation device 37 arranged to modulate the reference light ray 33. The first signal modulation device 35 is in this embodiment positioned between the beam splitter 29 and the measuring cell 23. However it could also be positioned after the measuring cell 23 but before a detector 39 also provided in the measuring device 21. The detector 39 is according to the invention arranged to detect the signal light ray 31 when it has been modulated and passed the measuring cell 23 and also detect the reference light ray 33 when it has been modulated. In this shown embodiment the detector 39 is provided such that the signal light ray 31 is detected by the detector 39 without any further redirection. The reference light ray 33 is instead in this embodiment redirected by a light direction changing device 41 such that the reference light ray 33 after redirection by the light direction changing device 41 and modulation by the second signal modulation device 37 is detected by the detector 39. The light direction changing device could be a mirror.

Figure 2B:
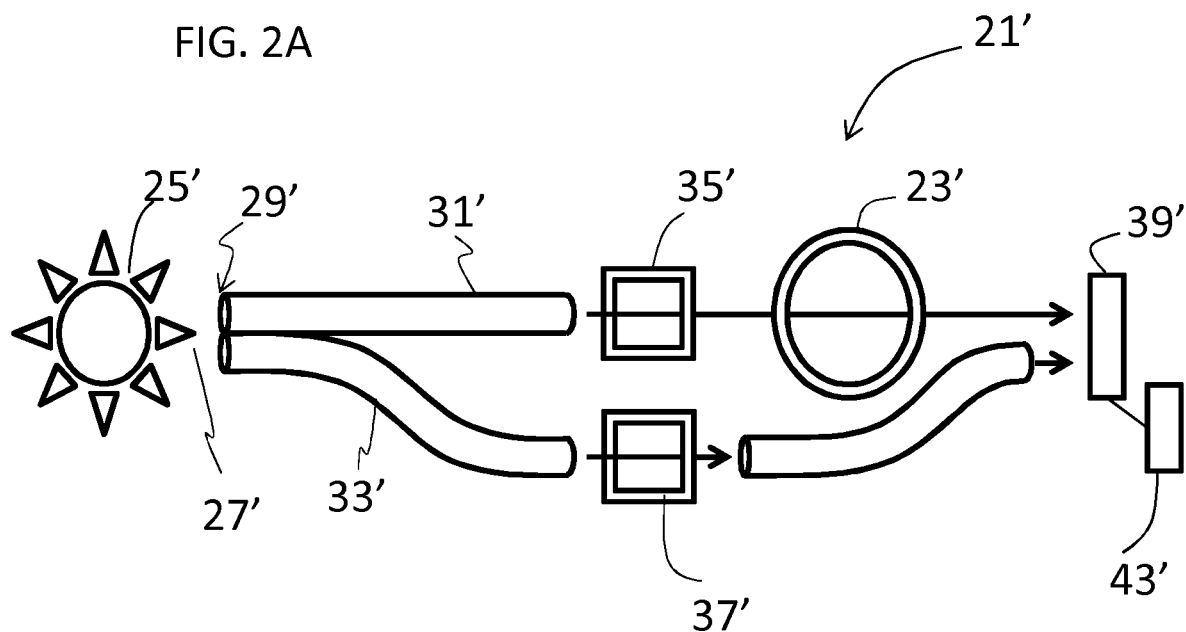
FIG. 2b shows schematically a measuring device according to another embodiment of the invention.

The second signal modulation device 37 is here shown to be provided after the light direction changing device 41 but it could also be provided between the beam splitter 29 and the light direction changing device 41. Of course the light direction changing device 41 could instead be provided in the signal light ray path and the detector 39 in the path way of the reference light ray, i.e. the direction of the reference light ray 33 directly after the beam splitter 29. More than one light direction changing device could also be provided in the measuring device in order to direct the signal light ray and the reference light ray to the same detector in a suitable way. Another alternative which would not require a light direction changing device at all could be to let two slightly divergent light rays from the light source fall onto a detector which is big enough for receiving them both or by guiding the light in optical fibers. The alternative with optical fibers is shown in FIG. 2b. See further description below.

With the measuring device according to the invention both the signal light ray 31 and the reference light ray 33 are detected by the same detector 39. The detector 39 comprises or is connected to a processing device 43 which is configured for performing synchronous detection of the detected signal in order to reconstruct the intensities of the signal light ray 31 and the reference light ray 33 from the combined signal detected by the detector 39. This is achieved by multiplying the detector signal by the modulation signals respectively and then low-pass filtering the results. In this way the two different signals are reconstructed and from them the absorption can be calculated. The processing device 43 can be completely made of hardware, completely made in software or a combination of the two. With this measuring device the signal light ray 31 and the reference light ray 33 can be detected simultaneously by the same detector 39.

The detector 39 comprises also normally a photo diode, an amplifier and an AD converter (not shown in the Figure). Furthermore an optical arrangement is usually provided between the light source 25 and the beam splitter 29. However this is not shown in the figures. This optical arrangement can comprise a collimating lens, an aperture and possibly also a filter.

The first signal modulation device 35 and the second signal modulation device 37 can for example be a chopper, a shutter, a movable mirror, a tuning fork or an adjustable grey filter. They could be separate devices or provided in the same device if the design of the measuring device and distances between the signal light ray and the reference light ray allows that. The first signal modulation device 35 and the second signal modulation device 37 should modulate the signals at different frequencies such that they can be differentiated in the detector. The modulation of the light rays creates an amplitude modulation at a set frequency. In one example the reference light ray can be modulated at a frequency somewhere in the range from 100 Hz to a few kHz and the signal light ray is modulated at a frequency that differs with at least 30% from the first frequency. The frequencies need to be chosen such that they do not interfere with other frequencies or their harmonics in the system.

The amplitude modulation can be sine modulation, square wave modulation or any other waveform that is suitable.

In another embodiment of the invention one of the first or the second signal modulation device 35, 37 is instead a device which is controlling the light source 25. Controlling the light source 25, such as for example turn it on and off by a specific frequency will of course affect both the signal light ray and the reference light ray but in combination with one signal modulation device in either the signal light ray or the reference light ray the two signals can still be differentiated from each other in the detector in a correct way if the measured signal is adjusted by adding the difference between the "light on"/"modulator on" and the "light on"/"modulator off" value to each "light off"/"modulator on" portion of the signal.

In one embodiment of the invention the beam splitter 29 can be an asymmetrical beam splitter where a larger portion of the first light beam 27 is directed into the signal light ray 31 than the reference light ray 33. This could be useful since a larger part of the dynamic range of the detector then is used for the signal light ray.

FIG. 2b shows schematically a measuring device 21' according to another embodiment of the invention. In this embodiment the beam splitter 29' is provided as two optical fibers. The first light beam 27', light from the light source 25', is divided into a signal light ray 31' which is transferred in a first optical fiber and a reference light ray 33' which is transferred in a second optical fiber. The signal light ray 31' is modulated in a first signal modulation device 35'. The signal light ray 31' will pass through the solution in the measuring cell 23' before it is detected in the detector 39'. The reference light ray 33' is modulated in a second signal modulation device 37' before it is detected in the same detector 39'. Most of the details of this embodiment are the same as in the embodiment described above and will not be described further here.

Figure 3:
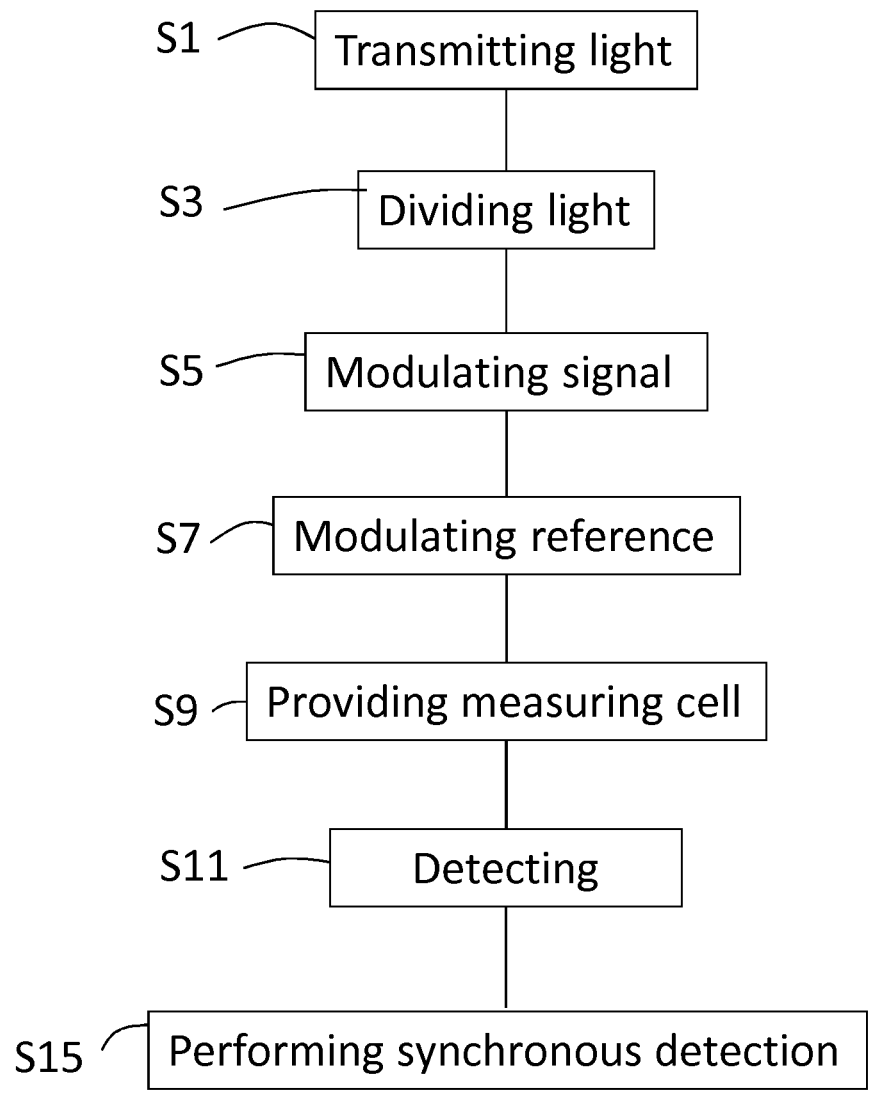
FIG. 3 is a flow chart of a method according to one embodiment of the invention.

FIG. 3 is a flow chart of a method for measuring the absorbance of light of a substance in a solution in a measuring cell 23 according to one embodiment of the invention. The method comprises the steps as described below, also with reference to FIG. 2:

S1: Transmitting a first light beam 27 from a light source 25 towards a beam splitter 29.

S3: Dividing the first light beam 27 into a signal light ray 31 and a reference light ray 33 by the beam splitter 29.

S5: Modulating the signal light ray 31 with a first signal modulation device 35.

S7: Modulating the reference light ray 33 with a second signal modulation device 37. However, if the construction and distances between the signal light ray and the reference light ray allows it the first and second signal modulation devices 35, 37 could be built into one and the same device.

In one embodiment of the invention the step of modulating the signal light ray comprises modulating the signal light ray at a first frequency and the step of modulating the reference light ray comprises modulating the reference light ray at a second frequency which is different from the first frequency. Furthermore, one possibility to modulate the signal light ray and the reference light ray is to create an amplitude modulation to both the signal light ray and the reference light ray. The amplitude modulation waveform could be a sine, square wave or any suitable waveform.

S9: Providing the measuring cell 23 such that the signal light ray 31 passes through the measuring cell.

S11: Detecting a signal in a detector 39, which signal is the combined signal intensity of the signal light ray 31 and the reference light ray 33 detected by the detector 39.

S15: Performing synchronous detection of the detected signal in order to reconstruct the intensities of the signal light ray 31 and the reference light ray 33 from the combined signal detected by the detector 39 based on the modulation performed to the signal light ray 31 and the reference light ray 33.

The detecting of the signal light ray 31 in the detector 39 and the detecting of the reference light ray 33 in the same detector 39 can with this method be performed simultaneously.

In one embodiment the method further comprises the step of changing direction of one or both of the signal light ray 31 and the reference light ray 33 with at least one light direction changing device 41 such that both the signal light ray and the reference light ray can be detected by the same detector 39. Another alternative could be to use optical fibers as discussed above.

In applications where a sample is flowing through the measuring cell the measuring cell is called a flow cell. This could be for example in a chromatography system where there is a need for continuously measuring a concentration of a substance in a flow. In the example of a chromatography system a protein concentration can be measured in an outflow from a chromatography column. The outflow from the chromatography column is provided through a flow cell of a measuring device according to the invention. The long and continuous measurements of flowing samples are much more sensitive to drift in the system compared to when measuring on a static sample. Hereby the method and measuring device according to this invention is especially suitable for measuring the absorbance of a substance in a solution provided in a flow cell.

The invention claimed is:

1. A method for measuring the absorbance of light of a substance in a solution in a chromatography measuring cell, said method comprising the steps of:
   transmitting a first light beam from a light source towards a beam splitter;
   dividing the first light beam into a signal light ray and a reference light ray by the beam splitter;
   modulating the signal light ray;
   modulating the reference light ray;
   providing the measuring cell such that the signal light ray passes through the measuring cell, wherein the measuring cell is a flow cell;
   detecting a signal in a detector, which signal is the combined signal intensity of the signal light ray and the reference light ray detected by the detector;
   performing synchronous detection of the detected signal in order to reconstruct the intensities of the signal light ray and the reference light ray from the combined signal detected by the detector, said synchronous detection being based on the modulation performed to the signal light ray and the reference light ray,
      wherein the beam splitter is an asymmetrical beam splitter dividing the first light beam into the signal light ray and the reference light ray where a larger portion of the first light beam is directed to the signal light ray than to the reference light ray, wherein the signal light ray and the reference light ray are detected in the same detector simultaneously, and
      wherein the step of modulating the signal light ray comprises modulating the signal light ray at a first frequency and the step of modulating the reference light ray comprises modulating the reference light ray at a second frequency which is different from the first frequency.

2. Method according to claim 1, wherein the steps of modulating the signal light ray and the reference light ray comprise creating a sine modulation or a square wave modulation to both the signal light ray and the reference light ray.

3. Method according to claim 1, further comprising the step of changing direction of one or both of the signal light ray and the reference light ray with at least one light direction changing device such that both the signal light ray and the reference light ray can be detected by the same detector.

4. Method according to claim 1, wherein the step of modulating one of the signal light ray or the reference light ray comprises controlling the light source.

5. Method according to claim 1, wherein the reference light ray is modulated at a frequency somewhere in the range from 100 Hz to a few kHz and the signal light ray is modulated at a frequency that differs with at least 30% from the first frequency.

6. The method according to claim 1, wherein the detector comprises or is connected to a processing device which is configured for performing synchronous detection of the detected signal in order to reconstruct the intensities of the signal light ray and the reference light ray from a combined signal detected by the detector.

7. The method according to claim 6, comprising multiplying the detector signal respectively by modulation signals and then low-pass filtering the result.

8. A measuring device for measuring the absorbance of a substance in a solution in a chromatography measuring cell of the measuring device, wherein said measuring device comprises:
   a light source configured to transmit a first light beam;
   a beam splitter provided such that the first light beam is divided by the beam splitter into a signal light ray and a reference light ray;
   the measuring cell positioned such that the signal light ray will pass through the measuring cell, wherein the measuring cell is a flow cell;
   a first signal modulation device arranged to modulate the signal light ray; and
   a second signal modulation device arranged to modulate the reference light ray; and
   a detector arranged to detect the signal light ray when it has been modulated and passed the measuring cell and also detect the reference light ray when it has been modulated, wherein the detector comprises or is connected to a processing device which is configured for performing synchronous detection of the detected signal in order to reconstruct the intensities of the signal light ray and the reference light ray from the combined signal detected by the detector, said synchronous detection being based on the modulation performed to the signal light ray and the reference light ray,
      wherein the beam splitter is an asymmetrical beam splitter dividing the first light beam into the signal light ray and the reference light ray where a larger portion of the first light beam is directed to the signal light ray than to the reference light ray, wherein the detector is configured to detect the signal light ray and the reference light ray simultaneously, and
      wherein the first signal modulation device and the second signal modulation device are configured to modulate the signals at different frequencies.

9. A measuring device according to claim 8, further comprising at least one light direction changing device arranged to change the direction of the reference light ray or the signal light ray such that they can be detected by the same detector.

10. Measuring device according to claim 8, wherein the first signal modulation device is a chopper, a shutter, a movable mirror, a tuning fork or an adjustable gray filter provided somewhere in the light path of the signal light ray.

11. Measuring device according to claim 8, wherein the second signal modulation device is a chopper, a shutter, a movable mirror, a tuning fork or an adjustable gray filter provided somewhere in the light path of the reference light ray.

12. Measuring device according to claim 8, wherein one of the first or second signal modulation device is a device configured to control the light source.

13. The measuring device according to claim 8, wherein the reference light ray is modulated at a frequency somewhere in the range from 100 Hz to a few kHz and the signal light ray is modulated at a frequency that differs with at least 30% from the first frequency.

14. A method for measuring the absorbance of light of a substance in a solution in a chromatography measuring cell, said method comprising the steps of:
- transmitting a first light beam from a light source towards a beam splitter;
- dividing the first light beam into a signal light ray and a reference light ray by the beam splitter;
- modulating the signal light ray;
- modulating the reference light ray;
- providing the measuring cell such that the signal light ray passes through the measuring cell, wherein the measuring cell is a flow cell;
- detecting a signal in a detector, which signal is the combined signal intensity of the signal light ray and the reference light ray detected by the detector;
- performing synchronous detection of the detected signal in order to reconstruct the intensities of the signal light ray and the reference light ray from the combined signal detected by the detector, said synchronous detection being based on the modulation performed to the signal light ray and the reference light ray,
- wherein the beam splitter is an asymmetrical beam splitter dividing the first light beam into the signal light ray and the reference light ray where a larger portion of the first light beam is directed to the signal light ray than to the reference light ray, wherein the signal light ray and the reference light ray are detected in the same detector simultaneously, and
- wherein the steps of modulating the signal light ray and the reference light ray comprise creating a sine modulation or a square wave modulation to both the signal light ray and the reference light ray, and
- wherein the step of modulating the signal light ray comprises modulating the signal light ray at a first frequency and the step of modulating the reference light ray comprises modulating the reference light ray at a second frequency which is different from the first frequency.

* * * * *